United States Patent
Wang et al.

(10) Patent No.: US 7,473,455 B2
(45) Date of Patent: Jan. 6, 2009

(54) XYLON TYPE BAMBOO, DEVICE OF MAKING THEREOF AND METHOD OF MAKING THEREOF

(76) Inventors: Xiongwei Wang, Room 202, No. 31, Lane 96, Xiang De Road, Hong Kou District, Shanghai (CN) 200081; Xionghui Wang, Room 202, No. 31, Lane 96, Xiang De Road, Hong Kou District, Shanghai (CN) 200081; Hisako Igawa, 643-4, Isidahigasikou Sangawamati Sanukisi, Kagawa (JP) 769-2321

( * ) Notice: Subject to any disclaimer, the term of this patent is extended or adjusted under 35 U.S.C. 154(b) by 496 days.

(21) Appl. No.: 11/241,466

(22) Filed: Sep. 30, 2005

(65) Prior Publication Data
US 2007/0077444 A1  Apr. 5, 2007

(51) Int. Cl.
*B32B 3/10* (2006.01)

(52) U.S. Cl. .................. 428/54; 428/292.4; 428/536; 428/537.1; 264/109; 264/115; 264/120; 52/390

(58) Field of Classification Search .......... 428/536, 428/54, 292.4, 537.1; 264/115, 109, 120; 52/390
See application file for complete search history.

(56) References Cited

U.S. PATENT DOCUMENTS 6,641,885 B2 * 11/2003 Lou ........................ 428/54
6,841,231 B1 * 1/2005 Liang et al. ............... 428/296.7

* cited by examiner

*Primary Examiner*—Leszek Kiliman
(74) *Attorney, Agent, or Firm*—Squire Sanders & Dempsey LLP

(57) ABSTRACT

The present invention provides a manufacture method for processing bamboo timber into high strength and xylon type bamboo timber methods for rearranging bamboo timber fibers, and articles formed of the xylon type bamboo timber.

17 Claims, 4 Drawing Sheets

XYLON TYPE BAMBOO, DEVICE OF MAKING THEREOF AND METHOD OF MAKING THEREOF

TECHNICAL FIELD

The present invention relates to a xylon type bamboo timber and its manufacturing method.

TECHNICAL BACKGROUND

In the world, especially in China, there are plenty of bamboo resources. It is just the issue that the human being has been investigating and researching hard, i.e., making full use of the natural bamboo resources, raising the value of bamboo, using bamboo to substitute the traditional usage of wood and compensating the short supply of wood so as to substitute bamboo for wood.

For processing bamboo into section materials, the customary method is to split bamboo, eliminate the curvature of bamboo and process it into rectangular sheets after being dried, then apply adhesive on the sheets, overlap them one by one and press and adhere them together into the section material. This processing method does not change, however, the array orientation of bamboo fibers, and the finished bamboo plates therefrom are easy to bend and arch and get degummed and cracked in the worst case. It is well known that due to the differences of thickness and density of fibers between the outer and inner layers of bamboo, the bamboo plate may extend to get a little more flatness in the course of being dried while it may get curled and bent in the course of being damped. Making raw bamboo into rectangular bamboo sheets does not change the difference between the inner and outer layers of bamboo, and the sheets may bend inward continuously on absorbing moisture. Therefore, by means of this forming method, the bamboo sections may absorb moisture and get deformed continuously in storage or use at a relatively higher temperature, and get degummed and cracked in the worst case. Furthermore, the density of bamboo sections made by this method is close to the density of raw bamboo.

Some current processes may rearrange bamboo fibers. However, the relevant working load and cost are high for splitting bamboo into bamboo wires, and the practical production is difficult to form a certain scale; in addition, due to the failure to consider the unification of water content of bamboo prior to impregnating adhesive, especially the water content is not be unified prior to pressure-moulding, thus physical performances of section bamboo after thermosetting is unstable, and some fatal defects may often occurred, such as degumming, cracking and deforming.

SUMMARY

One objective of this invention is a moulding method for providing regular arrangement of bamboo fiber, and a kind of xylon bamboo material formed by combining low adhesive reinforced bamboo fibers. Section bamboo of different specification with enhanced hardness, density and stability can be made with this method according to different needs and requirements.

According to one embodiment of the present invention, the xylon type bamboo has a density of 1.0-1.3 g/m$^3$, a hardness of 64-110 MPa, the static bend strength of 97-180 MPa, an expanding rate of thickness of 0.3-0.45% with absorbing water for 24 hours, and an impact toughness of 114-140 KJ/m$^2$.

Because the amount of adhesive used is low, and the adhesive can be an organic synthetic adhesive, which can be thermosettable and/or water soluble adhesive, or a modified performance adhesive thereof, the amount of formaldehyde to be released from the xylon bamboo according to the present invention is only 4.5-5.7 mg/100 g or below.

In some embodiments, to obtain the above-mentioned xylon type bamboo with enhanced performances, it is provided a method of making the xylon bamboo material, the method comprising: (1) breaking a raw bamboo into thin conglutination slices in a length of about 6 m or below, a width of about 1.5 to 4.5 cm and a thickness of about 0.25 cm or below, (2) impregnating the slices with an adhesive during which the moisture content is limited to about 8-13% prior to impregnating and the adhesive content is limited to about 1-3% after impregnating; (3) drying to limit the moisture content of the bamboo raw material (thin bamboo slices) to 15-20%; and (4) installation by molding, which includes suppressing the bamboo raw material by a pressure of about 80-280 MPa, thermosetting (temperature 120-150 degrees centigrade and time 3-15 hours) along with the mould, and then demoulding to obtain a profiled bamboo material.

In some embodiments, the above-mentioned thin bamboo slices can have different length for use according to the actual conditions. Generally, the preferred length range is about 2-3 m, and the preferred width of the thin bamboo slice is about 2-3 cm.

Prior to impregnating adhesive and installation moulding, the thin bamboo conglutination slice can be treated (e.g. with hydrogen peroxide solution or carbonization) to obtain certain effects according to established methods. For example, after the hydrogen peroxide solution treatment the original color bamboo timber can be obtained; and after carbonization the coffee-like bamboo timber can be obtained.

The adhesive can be, for example, synthetic organic thermosetting adhesive, which can be water soluble, or a modified adhesive thereof. The adhesive can include an alkaline activator as a catalyst. The amount of adhesive used can be about 1-3% by weight, which allows the formation of section bamboo materials with enhanced properties and limits the release of dissociative formaldehyde to a low level.

In some further embodiments, the thin bamboo slices can be placed in the interior mould of a pressing mould in an irregular, but even array/placement with random arrangement of the inner and outer layers (faces) of the thin bamboo slices, and then, according to the required section material specification and size, pressed into the section bamboo material using a pressing block loaded by a presser under a pressure of about 80 MPa to about 280 MPa.

In some embodiments, prior to demolding, the temperature can be controlled under 30 degrees Centigrade or room temperature.

Materials waking, the profiled materials (section bamboo material) must be rested for ten days or longer before further processing.

According to one aspect of the present invention, it is provided a press mould device, comprising:

(a) an inner mould used to preserve bamboo timber for processing;

(b) an outer mould affixed outside the inner mould;

(c) a moulding pressing plate which can cover on the surface of bamboo timber; and (d) a press block loaded by a presser on the above-mentioned moulding press plate.

The press mold device can further include a number of fastening devices mechanisms that contain fixing block(s), crooked bolt(s), backing board(s) and several fixing nuts. The fastening device can be set at both ends of the inner mold for fixing inner mould and the press block.

In according to a further embodiment of the present invention, it is provided a kind of manufacture method for processing bamboo timber into high strength and xylon type bamboo (section bamboo material), which rearranges the bamboo timber fiber. A bamboo fiber tube has a dense side which is the outer layer and a non-dense side which is the inner layer. The difference between the inner side and outer side leads to bending of the bamboo fiber upon absorbing moisture. According to one embodiment of the shaping method provided herein, raw bamboo can be cut into thin slices, which can be pressed into bamboo conglutination slices. The bamboo conglutination slices then can be placed in the mould in an even, non-regular form of distribution. Random arrangement of the inner and outer layers of the thin bamboo slices allows the bending and arching to offset each other in the course of moisture absorption of the bamboo slices. At the same time, the use of low adhesive activation compositions, the pressing process with a high pressure, and the controlled level of moisture of the pre-pressing bamboo raw material between about 15 and about 20% lead to enhanced stability after solidification of products, avoiding the warping, deformation, fracture, wetly inflation and etc caused by seasonal variation in the course of using. Performance of such section bamboo material is enhanced. Upon examination, its density can be up to $1.3/m^3$, release level of dissociative formaldehyde can be as low as 0.1/mg/L, and the rate of moisture absorption thickness inflation in 24 hours can be as low as 0.3-0.45% (far lower than standard value). Because of the rearrangement bamboo fiber structure, many of its indexes can be superior to that of xylon.

An advantage of the present process is that it does not break down the bamboo fibers. The manufacturing method according to the invention just breaks raw bamboo into bamboo conglutination slice without destroying the vertical fiber of the bamboo timber. Together with low adhesive addition, the bamboo timber prepared according to the method described herein has a natural texture similar to xylon.

The manufacturing method provided herein rearranges and presses bamboo slices under high pressure. Therefore, it can conveniently rearrange bamboo timber into various kinds of section materials with different desired outline. Because of its enhanced properties and performances, the section material disclosed herein can be widely used for building, internal and external doors and windows, ladder, platform, wall, floor and etc. It can also be used in furniture, cooking apparatus, office appliances and handicraft. Furthermore, it can substitute xylon and steel in shipping industry, aviation industry, railway, automobile industry and etc.

As used herein, the terms "section material" or "section bamboo material" are used interchangeably with each other and interchangeably with the term "xylon type bamboo timber" or "xylon type bamboo."

EMBODIMENTS

Figure 1:
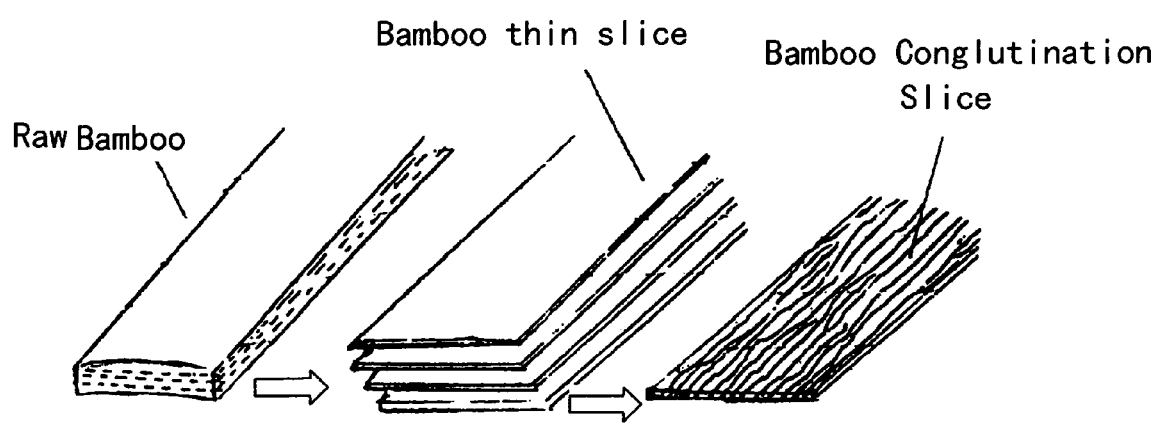
FIG. 1 is a sketch map for raw bamboo made into bamboo conglutination slice.
Figure 2:
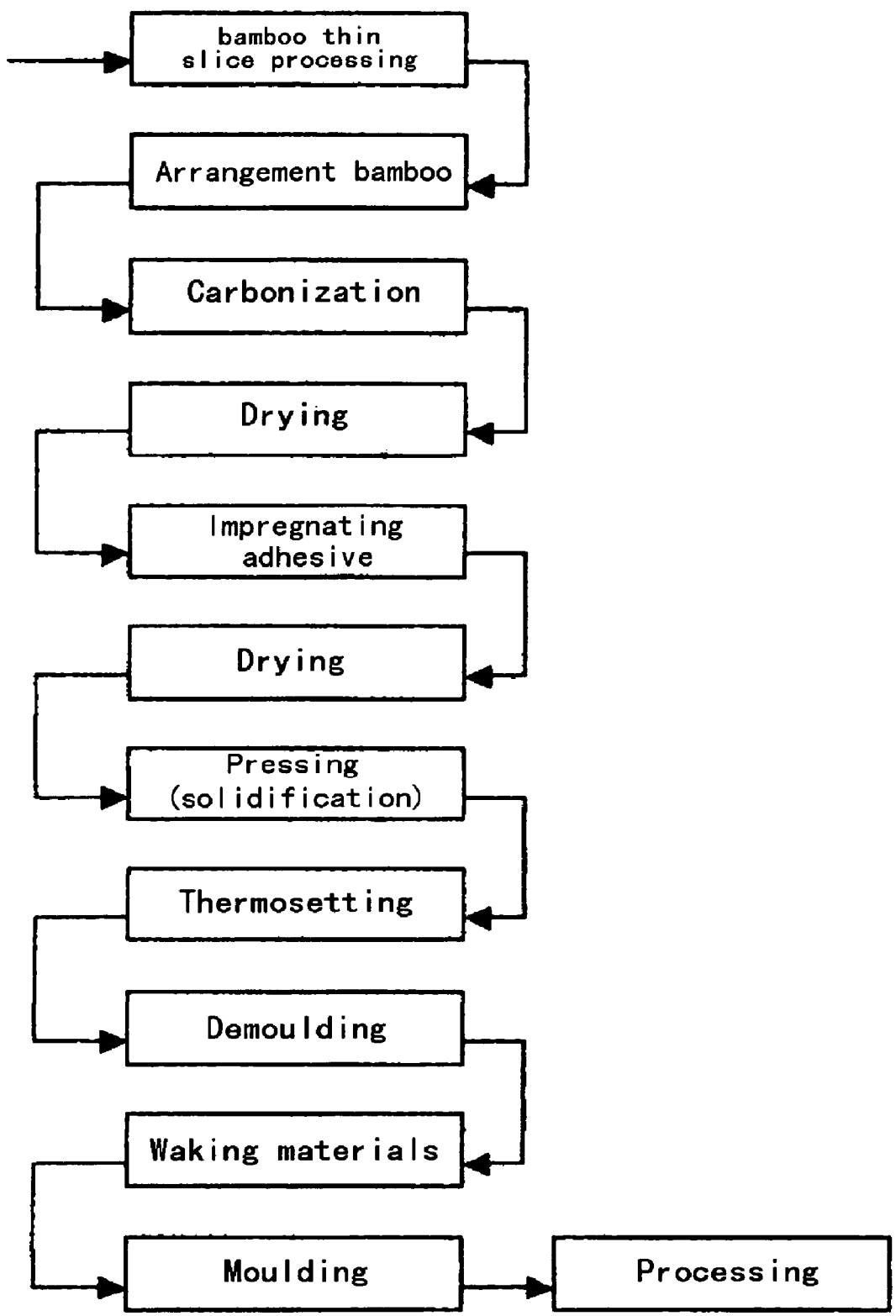
FIG. 2 is a flow chart of the manufacturing method of this invention.

The following embodiments of the present invention are described in reference to the figures. Referring to FIG. 1 and FIG. 2; the embodiments of the manufacturing method of the invention are descried as follows:

EXAMPLE 1

A Xylon Bamboo was Prepared According to the Following Steps

1. Preparation of Raw Bamboo which Includes Thin Bamboo Slice Processing:

Breaking raw bamboo into thin bamboo slices, selecting slices with a length of about 2 m, a width of about 2 cm and a thickness of about 0.15 cm, pressing these slices with several series of pressure rollers of protruding top and concave bottom into bamboo conglutination slices with horizontal non-broken, vertical loosing and linking to each other;

2. Carbonization:

The above-mentioned bamboo conglutination slices can be carbonized according to established methods;

3. Drying:

The carbonized bamboo conglutination slices can be placed in a drying tunnel and dried till the moisture content reaches about 9% by weight.

4. Impregnating adhesive:

Impregnating the dry bamboo conglutination slices with an adhesive, adding alkaline activator as a catalyst, and controlling adhesive content of the thin bamboo slices at about 5.95%, where the adhesive can be an organic synthesis thermosetting water soluble adhesive (for example phenol aldehyde glue) and modified-performance adhesive.

5. Drying:

Drying the impregnated bamboo conglutination slices in a drying tunnel till the moisture content reaches 16%.

6. Pressing (Solidification):

Evenly distributing the impregnated bamboo conglutination slices in an irregular way in the mould and pressing them. The press pressure can be about 120 Mpa.

7. Thermosetting:

Placing the pressed section material together with interior mould in a drying house for thermosetting for a period (e.g., 130° C., 5 hour).

8. Demoulding:

Cooling the interior mould to room temperature before demoulding the thermosetted section material from interior mould, and waking the thermosetted section materials (xylon type bamboo timber) by laying them overlappingly for about ten days or longer before further processing them into an article.

Performance Test Data:

Result of the analysis of the performance of a xylon bamboo made according to the method of the present invention according to steps 1-8, described above, are as follows: The density is 1.08 g/m$^3$, the hardness is 84.4 MPa, the static bend strength is 122 MPa, the moisture absorption thickness expanding rate is 1.4% for 24 hours, the impact toughness is 114.7 KJ/m² and the releasing dissociation amount of formaldehyde is 0.1 mg/L.

EXAMPLE 2

A Second Sample of Xylon Bamboo was Prepared According to the Following Steps

Selecting bamboo slices for use with a length of about 3 m, a width of about 3 cm and a thickness of about 0.23 cm, pressing them into conglutination slices, treating the conglutination slices with a hydrogen peroxide solution, drying the slices till the moisture content reaches the level of about 12%, impregnating the dried slices with an adhesive, the level of which in the slices are controlled at about 8%, drying the slices again to such that the moisture content level is uniform at about 18%, placing the slices in a mould, pressing the slices, thermosetting together with the mould, demoulding to obtain the section material.

The pressing pressure is 250 MPa; thermosetting temperature is 145 degrees Centigrade and time is 8 hours. The procedure of further processing is the same as Example 1.

Performance test data:

Result of the analysis of the performance of a xylon bamboo made according to the method of the Example 2, described above, are as follows: The density is 1.27 g/m³, the hardness is 101.5 MPa, the static bend strength is 159 MPa, the moisture absorption thickness expanding rate is 0.38% for 24 hours, the impact toughness is 136.5 KJ/m² and the release level of the disassociative formaldehyde from the xylon bamboo is 4.8 mg/110 g.

The method described herein also contemplates a process for making xylon bamboo that does not include the step of pressing the bamboo slices into bamboo conglutination slices but otherwise is similar to the process described above.

Figure 3:
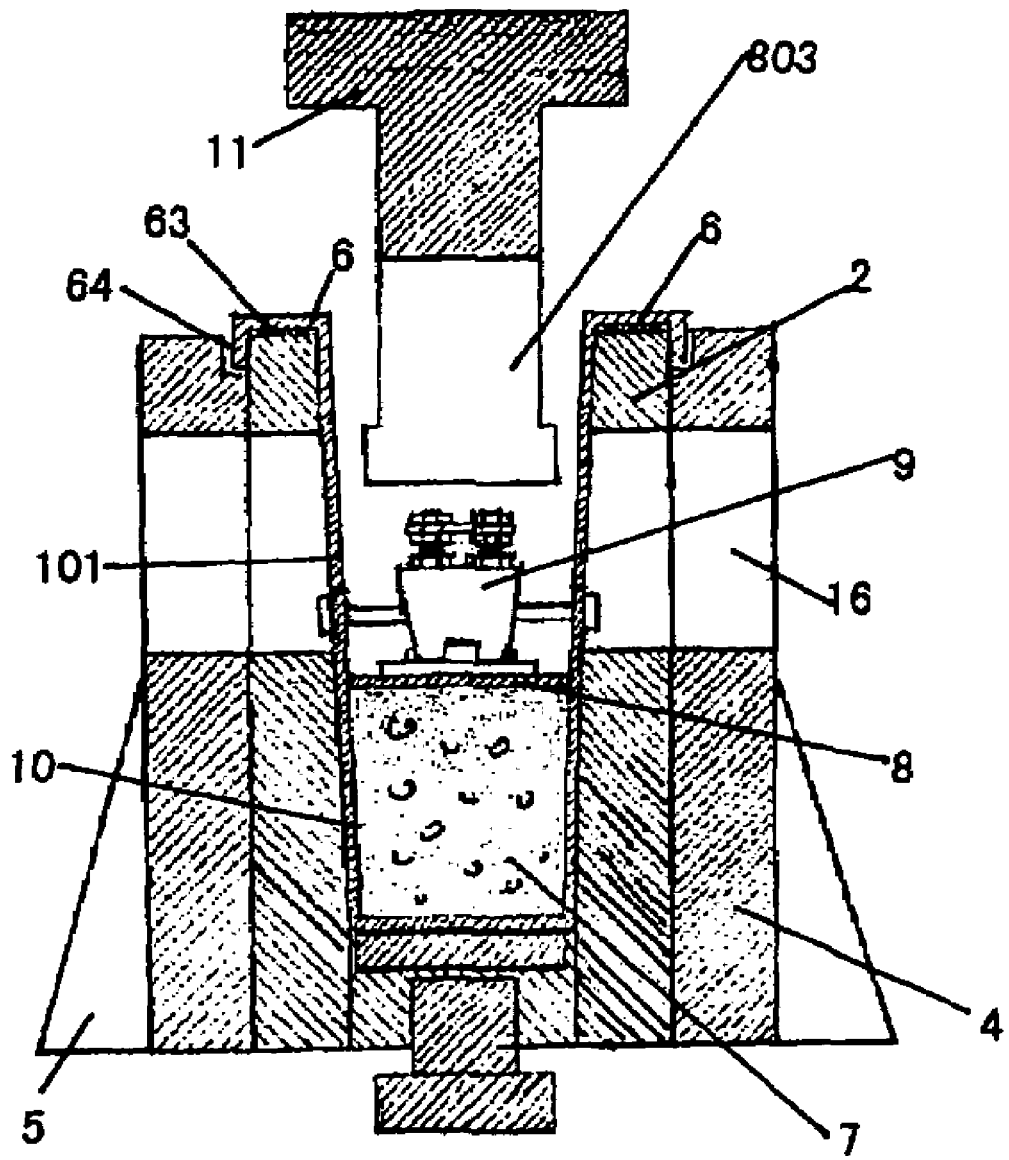
FIG. 3 is a structural sketch of a bamboo press device for the manufacturing method as shown in FIG. 2.
Figure 4:
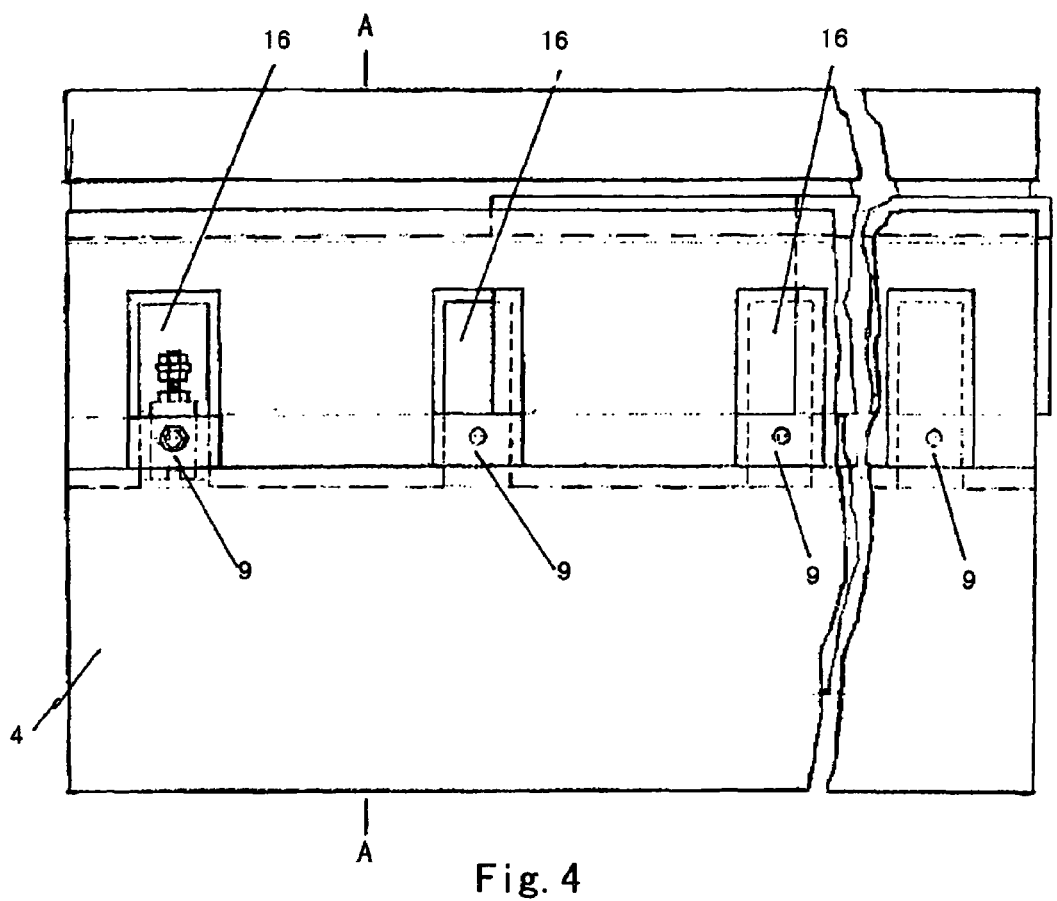
FIG. 4 shows A plane section figure of the bamboo press device of FIG. 3.

Referring to FIG. 3 and FIG. 4, the bamboo timber press device includes a U-type inner mould 10 for preserving bamboo timber for processing, an outer mould 2 set outside the inner mould, two movable plates 6 set separately on each up side of the inner mould and its side face contacting the inner side of the outer mould, a mould press plate 8 covering the surface of bamboo timber 7, a press block 3 on the above-mentioned press plate loaded by press machine 1, a presser 1 capable of pressurizing the press block 3 through the upper mould 11. The above-mentioned outer mould 2 is used for supporting and fixing the inner mould 10. Outside the outer mould 2, a fastening plate 4 and a fastening bracket 5 are set for further fastening the outer mould 2.

Figure 5:
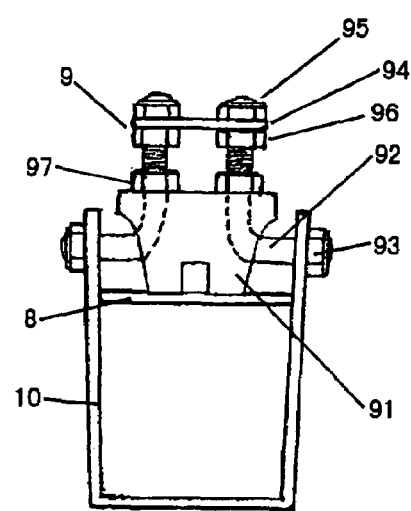
FIG. 5 is structural sketch of the fastening device of bamboo press device mentioned FIG. 3.

The interior mould 10 is upside down ladder-shaped, i.e. for the horizontal size upper is big and lower is small, thus it benefits demoulding. Two movable plates 6 are in fact two independent plates. There is a hook 63 on each of the plate 6 which can lay in the slot 64 between the outer mould fastening plate 4 and the outer mould 2, and thus, it can be fixed on the outer mould 2. The hook 63 can slide horizontally in slot 64 so as to easily move out. There are several holes/windows 16 on the sides of the outer mould 2 which are used for fixing the fastening device 9 (see FIG. 5 below for details). As shown in FIG. 5, the fastening device 9 includes the fixing block 91, crooked/bend bolt 92, backing plate 94 and nuts 93, 95, 96 and 97. There are screws on both ends of the bend bolt 92, and one end almost horizontally goes through the side wall of the inner mould 10 and is fixed by nut 93, and the other end almost vertically goes through backing plate 94 and is fixed by nuts 95 and 96 and the backing plate 94. The center part of bend bolt 92 goes through a hole of fixing block 91, of which nut 97 can screw the upper surface of the fixing block 91 and can screw tightly close to the upper surface. The lower surface of the fixing block 91 contacts the press plate 8 and pins it so that it can not move upwards. The adjusting nut 97 (screws tightly or loose) can make the fixing block 91 move up and down as to adjust the press plate 8 for pressing downwards or loosing upwards.

An embodiment of the bamboo press device according to the present invention works as described below:

The inner mould 10 firstly is put into external mould 2. The bamboo materials 7 for processing usually are slices or bars, that is, bamboo conglutination slices. When the bamboo materials 7 for processing impregnated with an adhesive are placed in the inner mould 10, one starts up the press machine 1 (such as hydraulic pressure pump). Forced by the press machine 1, the press block 3 pressurizes the mould press plate 8. Thus, by removing of movable plates 6 and moving downwards of the press plate 8, the bamboo 7 continuously gets forced and its top surface moves downwards. When it reaches certain position (now the top surface of bamboo 7 has already been under the top plane of inner mould 10), one mounts separately the fastening device 9 on fixing hole 16 and screw tightly nut 97 as to make the fixing block 91 pin the mould plate 8 to avoid the situation where the bamboo 7 pushes the mould plates 8 and 3 due to tensile force prior to complete solidification of adhesive. One then moves the whole fixed inner mould 10 to solidification workshop for solidification. As being stable, one can loosen the nuts 93, 95, 96, 97 and the bend bolt 92, and take out the mould plate 8. The finished bamboo board is then obtained.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

What is claimed:

1. A bamboo timber having a density between about 1.0 g/m³ and about 1.3 g/m³, a hardness between about 64 MPa and about 110 MPa, a static strength between about 97 MPa and about 180 MPa, an expanding rate of thickness between about 0.3% and about 0.45% for moisture absorption within 24 hours and an impact toughness between about 114 KJ/m² and about 140 KJ/m².

2. The bamboo timber of claim 1, having a release level of dissociative formaldehyde between about 4.5 mg/100 g and about 4.7 mg/100 g.

3. A method of making the bamboo timber of claim 1, comprising
   (a) breaking a raw bamboo into bamboo slices with a length of about or less than 6 m, a width of about 1.5 cm to about 4.5 cm and a thickness of about or under 0.25 cm;
   (b) impregnating the bamboo slices with an adhesive, where the moisture level prior to impregnating is controlled at between about 8% and about 13% and the adhesive content is controlled at between about 1% and about 3% after the impregnating;
   (c) drying the slices such that the moisture content of the bamboo impregnated with adhesive is between about 15 and about 20%;
   (d) installation moulding the slices to form a section/mould material by pressing with a pressure of between about 80 MPa and about 280 MPa;
   (e) continuously thermosetting the section material together with mould; and
   (f) demoulding to obtain the bamboo timber.

4. The method of claim 3, wherein the bamboo timber has a release level of dissociative formaldehyde between about 4.5 mg/100 g and about 4.7 mg/100 g.

5. The method of claim 3, wherein breaking a raw bamboo into bamboo slices comprises breaking the raw bamboo with several rollers into bamboo conglutination slice with horizontal non rupture, vertical loosing and interlocking.

6. The method of claim 3, wherein the length of the bamboo slices is between about 2 m and about 3 m.

7. The method of claim 3, wherein the width of the bamboo slices is between about 2 cm and about 3 cm.

8. The method of claim 3, wherein the adhesive is an organic synthetic adhesive which is thermosettable and water soluble or a modified adhesive thereof.

9. The method of claim 3, wherein impregnating the slices with an adhesive further comprises adding an alkaline activator to the adhesive as catalyst.

10. The method of claim 3, wherein the pressure is between about 110 MPa and about 200 MPa.

11. The method of claim 3, wherein the thermosetting temperature is between about 120 degrees Centigrade and about 150 degrees Centigrade and the time is between about 3 hours and about 15 hours.

12. The method of claim 3, wherein demoulding is conducted at a temperature under about 30 degrees Centigrade or at room temperature.

13. The method of claim 3, further comprising
   (g) waking the bamboo timber for a period of about 10 days or longer.

14. An article comprising the bamboo timber of claim 1.

15. The article of claim 14, which is a building article, an article of internal and external doors or window, a ladder, a platform, a wall article, and a floor article.

16. The article of claim 14, which is selected from the group consisting of furniture, cooking apparatus, office appliances and handicraft.

17. The article of claim 14, which is an article on a shipping carrier, an aviation carrier, a railway carrier, or an automobile.

* * * * *